United States Patent Office 3,361,770
Patented Jan. 2, 1968

3,361,770
A-NOR-ANDROSTANES AND PROCESS FOR THEIR MANUFACTURE
Aurelio Romeo, Rome, Italy, assignor to Ciba Corporation, New York, N.Y., a corporation of Delaware
No Drawing. Filed June 1, 1966, Ser. No. 554,351
Claims priority, application Switzerland, June 11, 1965, 8,192/65; July 26, 1965, 10,443/65; Oct. 20, 1965, 14,494/65
14 Claims. (Cl. 260—347.8)

The present invention relates to the manufacture of new 5α-methyl-A-nor-androstanes, especially those of the formula

I

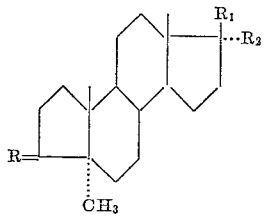

where R represents an oxo group, or a hydrogen atom together with a free or esterified hydroxyl group, $R_1$ represents a free, etherified or esterified hydroxyl group and $R_2$ a hydrogen atom or a lower saturated or unsaturated aliphatic radical, or $R_1+R_2$ represent an oxo group.

An esterified hydroxyl group is primarily the acid residue of an aliphatic, alicyclic, araliphatic or aromatic carboxylic acid containing up to 20 carbon atoms, for example the residue of formic, methylcarbonic, acetic, trifluoroacetic, trimethylacetic, propionic, caproic, decanoic, undecylenic, hexahydrobenzoic, cyclopentylpropionic, phenylpropionic, benzoic or furoic acid. An etherified hydroxyl group is above all one etherified with an aliphatic, cycloaliphatic or araliphatic alcohol, such as a furanyl or pyranyl alcohol.

Suitable lower saturated or unsaturated aliphatic radicals are, for example, lower alkyl such as methyl, ethyl, propyl or isopropyl radicals, lower alkenyl such as vinyl, allyl or methallyl radicals, or lower alkinyl such as ethinyl or propinyl radicals, or the corresponding halogenated residues, for example the trifluoromethyl-ethinyl group. The term "lower" as used above and below with reference to hydrocarbon residues defines such residues containing up to 5 chain carbon atoms.

The new A-nor-androstanes possess valuable pharmacological properties. Inter alia, in test animals they display a particularly high antiandrogenic action and produce a selective inhibition of the androgenic effect of testosterone without affecting the anabolic action of the latter; they are distinctly superior to the known 17α-methyl-B-nortestosterone. They may therefore be used pharmacologically in animal tests and as medicaments, for example for treating hirsutism, if desired also in veterinary medicine, as antiandrogens. They are also suitable for use as intermediates in the manufacture of medicaments.

Of special value are those compounds of the Formula I in which R represents an oxo group, $R_1$ an esterified or preferably a free hydroxyl group and $R_2$ a methyl or ethyl group or in the first place a hydrogen atom.

The new 5α-methyl-A-nor-androstanes are obtained when a compound of the formula

II

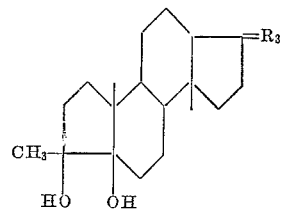

where $R_3$ represents a free or protected keto group such as a ketal group, for example an alkylenedioxy, especially the ethylenedioxy group, a β-positioned free, etherified or esterified 17β-hydroxyl group together with a hydrogen atom, or an α-positioned lower saturated or unsaturated aliphatic residue together with a β-positioned esterified hydroxyl group—is subjected to the pinacolin rearrangement, if desired in a resulting compound the protected oxo group is liberated, if desired (possibly while providing intermediate protection for the 3-oxo group) a resulting 17α-unsubstituted 17β-hydroxy compound is oxidized to the 17-oxo compound, a resulting oxo compound is reduced to the corresponding hydroxy compound or reacted with a metal derivative or a lower saturated or unsaturated aliphatic compound to the 17α-substituted 17β-hydroxy compound and/or a resulting hydroxy compound is esterified or etherified.

The conditions of the pinacolin rearrangement are known; for example the starting materials may be reacted with dehydrating acid agents such as zinc chloride, phosphorus pentoxide, mineral acids, for example sulfuric acid, hydrochloric acid, phosphoric acids, perchloric acid or per-iodic acid or with strong organic acids such as para-toluenesulfonic acid, methanesulfonic acid, formic acid or oxalic acid, or their halides or with mixtures of such agents. The rearrangement is advantageously carried out in a suitable solvent such as an alcohol, for example methanol or ethanol, or in an ether, for example tetrahydrofuran, dioxan or a glycol dimethyl ether, or especially in a weak organic acid such as propionic acid or in the first place acetic acid or in a mixture of such solvents. If desired, the dehydrating agent itself may alternatively be used as solvent.

If the rearrangement gives rise to a compound containing a protected keto group in position 17, then the oxo group in position 3 can be selectively reduced to the 3-hydroxyl group, for example with a complex lightmetal hydride, especially an alkali metal borohydride or lithium-aluminium hydride. This reduction may also be carried out after having liberated the 17-oxo group, so that the two keto groups are reduced simultaneously to the corresponding hydroxyl groups. A free oxo group in position 17 may also be converted with a metal derivative, especially a Grignard compound or an alkali metal derivative, such as lithium or sodium derivative of the aliphatic compound mentioned, after having provided intermediate protection for the 3-keto group, into a 17α-substituted 17β-hydroxyl compound. When the process product contains a free hydroxyl group, the latter can be esterified in known manner, for example by reaction with a reactive functional derivative of one of the afore-mentioned acids, especially with the anhydride or a halide thereof. In this connection it is possible to perform this esterification together with the rearrangement. A possibly obtained ester can be converted in known manner, for example by hydrolysis or hydrogenolysis, into the free hydroxy compound. A free hydroxyl group may also be etherified, for example with vinylethyl ether, 2,3-dihydrofuran or -pyran or with an aliphatic alcohol. Furthermore, it can be converted by oxidation into a corresponding oxo compound in the known manner.

The present invention includes also any modification of the process in which an intermediate obtained at any stage of the process is used as starting material and any remaining step or steps is or are carried out or the process is discontinued at any stage thereof, or in which a starting material is formed in situ.

The compounds of the Formula II used as starting materials can be prepared in known manner, for example from the corresponding $\Delta^{3(5)}$-A-nor-androstanes by means of osmium tetroxide.

The new compounds of the Formula I may be used as medicaments, for example in the form of pharmaceutical preparations which contain them in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, cholesterol or other known medicinal excipient. The pharmaceutical preparations may be, for example, tablets, dragees or capsules, or in liquid form solutions, suspensions, emulsions, ointments or creams. They may be sterilized and/or may contain auxiliaries such as preserving, stabilizing, wetting or emulsifying agents, solutions promoters, salts for regulating the osmotic pressure or buffers. They may also contain other therapeutically valuable substances. The pharmaceutical preparations are formulated by conventional methods.

The new compounds may also be used in veterinary medicine, for example in one of the forms mentioned above or in the form of animal feeding stuffs or as additives to animal feeding stuffs, using, for example, the conventional extenders and diluents or, respectively, feeding stuffs.

The invention includes also the new starting materials.

The following examples illustrate the invention.

Example 1

A solution of 2.76 g. of 3-methyl-3,5,17β-trihydroxy-A-nor-androstane (M.P. 188–191° C.) in 100 ml. of glacial acetic acid is mixed with 0.2 g. of para-toluenesulfonic acid monohydrate and the whole is heated for 2 hours at 110 to 115° C. The cooled, dark-colored reaction solution is then diluted with water and exhaustively extracted with ether. The ethereal extract is washed first with sodium carbonate solution and then with water, dried over sodium sulfate and evaporated. The residual crude product furnishes on recrystallization from methanol 1.4 g. of 5α-methyl-17β-hydroxy-A-nor-androstan-3-one-acetate melting at 183 to 184° C. Optical rotation $[\alpha]_D = -54°$ (c.=1% in chloroform).

The starting material used in this example may be prepared, for instance, in the following manner:

A solution of 4.50 g. of $\Delta^{3(5)}$-3-methyl-17β-hydroxy-A-nor-androstene in 120 ml. of absolute ether is mixed with a solution of 5 g. of osmium tetroxide in 225 ml. of absolute ether and 4 ml. of absolute pyridine, whereupon the reaction product begins to settle out immediately. The batch is left to itself for 3 days at room temperature; the brown reaction product is then suctioned off and rinsed with cooled absolute ether. The yield of osmium tetroxide adduct after drying at 20 to 30° C. amounts to 10.8 g.

The resulting product is mixed with 160 ml. of ethanol of 95% strength and 160 ml. of benzene; then 22.5 g. of potassium hydroxide in 30 ml. of ethanol of 50% strength and 22.5 g. of mannitol are added and the whole is vigorously stirred for 10 hours, diluted with water and exhaustively extracted with ether. The ethereal extract is washed neutral with water, dried over sodium sulfate and evaporated, to yield 2.76 g. of 3-methyl-3,5,17β-trihydroxy-A-nor-androstane melting at 188 to 191° C. Optical rotation $[\alpha]_D = -15°$ (c.=1% in chloroform).

Example 2

A solution of 1.35 g. of 5α-methyl-17β-hydroxy-A-nor-androstan-3-one-acetate in 100 ml. of methanol is mixed with 2 ml. of concentrated potassium hydroxide solution and refluxed for 1 hour. The cooled reaction solution is then diluted with water and exhaustively extracted with ether, and the ethereal extracts are washed neutral with water, dried over sodium sulfate and evaporated. On recrystallization from methanol the residue furnishes 0.6 g. of 5α-methyl-17β-hydroxy-A-nor-androstan-3-one melting at 214 to 217° C. Optical rotation $[\alpha]_D = -51°$ (c.=1% in chloroform).

Example 3

A suspension of 500 mg. of the 3-oxo-5α-methyl-17β-acetoxy-A-nor-androstane described in Example 1 and 100 mg. of para-toluenesulfonic acid in 150 ml. of ethyleneglycol is heated at the boil for 3 hours in a water-jet vacuum while slowly distilling off about 50 ml. of the solvent. The cooled reaction mixture is poured into an ice-cold aqueous solution of sodium bicarbonate, and the precipitated amorphous reaction product is suctioned off, washed with water and taken up in ether. The resulting solution is washed neutral, dried and evaporated in a water-jet vacuum, to yield 560 mg. of crude 3,3-ethylenedioxy - 5α-methyl-17β-acetoxy-A-nor-androstane containing a small amount of the free 17-hydroxy compound. Without prior purification it is dissolved in 15 ml. of methanol, mixed with 2 ml. of an aqueous potassium carbonate solution of 5% strength and refluxed for 5 hours. Usual working up furnishes 480 mg. of crude 3,3-ethylenedioxy - 5α - methyl - 17β-hydroxy-A-nor-androstane. The product obtained in this manner is dissolved in 15 ml. of acetone, the solution is cooled to 0° C., and 0.5 ml. of an 8 N-chromic acid solution in dilute sulfuric acid is dropped in. The batch is stirred for 5 hours at 0° C., then mixed with 2 g. of solid sodium acetate, diluted with benzene and water, the aqueous layer is separated, and the benzene solution is washed 4 times with semisaturated sodium chloride solution, dried and evaporated in a water-jet vacuum. The resulting crude 3,3-ethylenedioxy-5α-methyl-17-oxo-A-nor-androstane is dissolved as it is in 30 ml. of absolute ether and dropped into a solution of excess methylmagnesium iodide in ether. The reaction mixture is refluxed for 4 hours, cooled, the excess reagent is decomposed and the whole is worked up as usual, to yield 390 mg. of 3,3-ethylenedioxy-5α,17α-dimethyl-17β-hydroxy-A-nor-androstane; this product is dissolved in 10 ml. of acetic acid of 66% strength and the solution heated for 30 minutes at 80° C. Working up furnishes 340 mg. of crude 3-oxo-5α,17α-dimethyl-17β-hydroxy-A-nor-androstane which is purified by chromatography on alumina.

Example 4

A solution of 3.48 g. of 3,3-ethylenedioxy-5α-methyl-A-nor-androstan-17-one in 250 ml. of ether is stirred dropwise within 45 minutes into a solution of excess methylmagnesium iodide in ether prepared from 2.38 g. of magnesium chips, 12 ml. of methyl iodide and 150 ml. of ether. The reaction solution is refluxed for another 16 hours and when cooled poured over 1 liter of ice water. The whole is acidified with 50 ml. of 4 N-hydrochloric acid, then 50 ml. of concentrated sodium bisulfite solution are added, the batch is extracted with ether, and the ethereal extract is washed with water, dried over sodium sulfate and completely evaporated, to yield 3.85 g. of 3,3- ethylenedioxy-5α-17α-dimethyl-17β-hydroxy-A-nor-androstane which melts at 172 to 177° C. and contains a small amount of free 3-ketone. The crude product is dissolved in 100 ml. of glacial acetic acid, 20 ml. of water are added, and the mixture is heated for 2 hours on a boiling water bath, then poured into 1 liter of water and extracted with ether. The ethereal extract is washed with dilute sodium carbonate solution and then with water, dried over sodium sulfate and completely evaporated. The crude product is purified by chromatography on silica gel. A fore-running is removed with benzene, whereupon a 9:1-mixture of benzene and ethyl acetate elutes a main fraction which is unitary in the thin-layer chromatogram and yields on recrystallization from ether 0.92 g. of 5α,17α-dimethyl-17β-hydroxy-A-nor-androstan-3-one melting from 190 to 192° C. Optical rotation $[\alpha]_D^{20°} = -68°$ (c.=0.447% in dioxan) and −65° (c.=1.164% in chloroform).

The starting material can be prepared thus:

A solution of 3.83 g. of 5α-methyl-17β-hydroxy-A-nor-androstan-3-one, 3.5 ml. of ethyleneglycol and 0.25 g. of para-toluenesulfonic acid monohydrate in benzene is heated for 4 days at the boil while continuously removing the water of reaction formed by azeotropic distillation in a Dean-Stark water separator. The cooled reaction solution is then washed with ice-cold aqueous sodium bicarbonate solution, then with water, dried over sodium sulfate and completely evaporated, to yield 4.1 g. of crude 3,3-ethylenedioxy-5α-methyl-17β-hydroxy-A-nor-androstane which still contains some unketalized 3-ketone. The crude product is purified by chromatography on silica gel; after separating a fore-running with 9:1 benzene+ethyl acetate, an 8:2-mixture of benzene+ethyl acetate elutes a ketone-free main fraction (2.2 g.) which is revealed in the thin-layer chromatogram to be unitary.

A solution of 3.6 g. of 3,3-ethylenedioxy-5α-methyl-17β-hydroxy-A-nor-androstane in 40 ml. of pyridine is run within 30 minutes at 15 to 22° C. into a suspension of 7.2 g. of chromium trioxide in 100 ml. of pyridine. The reaction mixture is then stirred on for 45 minutes at room temperature, whereupon a dark-brown solution forms which towards the end still contains an excess of chromium trioxide. The reaction solution is poured over 1 liter of ice water, 200 ml. of concentrated sodium bisulfite solution are added and the whole is extracted with ether. The ethereal extract is washed with water, dried over sodium sulfate and evaporated, to yield 3.4 g. of 3,3-ethylenedioxy-5α-methyl-A-nor-androstan-17-one melting at 185 to 188° C.

Example 5

A solution of 4.6 g. of 5α-methyl-17β-hydroxy-A-nor-androstan-3-one in 50 ml. of pyridine is run within 30 minutes at 15 to 20° C. into a suspension of 8.0 g. of chromium trioxide in 120 ml. of pyridine. The reaction mixture is then stirred for 4 hours at room temperature, during which gradually a dark-brown to black solution forms which towards the end still contains excess chromium trioxide. The reaction solution is poured over 1 liter of ice water, 200 ml. of concentrated aqueous sodium bisulfite solution are added and the whole is extrated with ether. The ethereal extract is rinsed with water, dried over sodium sulfate and evaporated. The crude product obtained in this manner is purified by chromatography on silica gel. After a fore-running has been isolated with benzene, a 9:1-mixture of benzene+ethyl acetate elutes a main fraction which is found to be unitary in the thin-layer chromatogram and furnishes on recrystallization from ethanol 2.7 g. of 5α-methyl-A-nor-androstane-3,17-dione melting at 190 to 191° C. Optical rotation $[\alpha]_D^{20°} = +26°$ (c.=1.080% in dioxan) and +29° (c.=1.166% in chloroform).

Example 6

10.0 grams of lithium acetylenide-ethylenediamine are dissolved with stirring at 10 to 15° C. under nitrogen in 300 ml. of dimethylsulfoxide distilled over calcium hydride. 10.0 grams of 3,3-ethylenedioxy-5α-methyl-A-nor-androstan-17-one are then added portionwise and the reaction mixture is stirred for 24 hours at room temperature under nitrogen. Then 120 ml. of water are slowly dropped in and the whole is diluted with another 2 liters of water, whereupon the reaction product slowly crystallizes out; it is suctioned off, thoroughly washed with water and dried in vacuo at 50 to 60° C., to yield 11.2 g. of crude 3,3-ethylenedioxy-5α-methyl-17α-ethinyl-17β-hydroxy-A-nor-androstane whose thin-layer chromatogram reveals the presence of small amounts of by-products. The crude product is then purified by chromatography on silica gel. A fore-running is separated with benzene, and a 9:1-mixture of benzene+ethyl acetate then elutes a main fraction whose thin-layer chromatogram proves it to be unitary.

The resulting main fraction is dissolved in 200 ml. of glacial acetic acid, mixed with 50 ml. of water and heated for 3 hours on a boiling water bath. The reaction solution is poured into 3 liters of water and extracted with ether. The ethereal extract is washed with dilute sodium carbonate solution and water, dried over sodium sulfate, filtered, and evaporated to dryness. On recrystallization from acetone the resulting crude product yields 5.2 g. of 5α-methyl-17α-ethinyl-17β-hydroxy-A-nor-androstan-3-one melting at 233 to 235° C. Optical rotation $[\alpha]_D^{20°} = -92° \pm 1°$ (c.=1.030% in dioxan).

Example 7

A suspension of 11.0 g. of 5α-methyl-17β-hydroxy-A-nor-androstan-3-one and 0.22 g. of para-toluenesulfonic acid monohydrate in 330 ml. of absolute ether is mixed with 11.0 ml. of 2,3-dihydrofuran; the whole heats up slightly and a clear solution forms from which, after standing overnight at room temperature, the reaction product begins to crystallize out. The reaction mixture is diluted with 3 liters of ether and the clear solution washed with ½ liter of a saturated sodium bicarbonate solution and then with water. The ethereal solution is dried over sodium sulfate, filtered and concentrated to 80 to 100 ml. whereupon the reaction product begins to crystallize out. The batch is kept overnight in the cold, the crystallizate suctioned off, washed with ether, cooled with carbon dioxide snow, and dried in a sodium cabinet at 50° C., to yield 7.39 g. of 5α-methyl-17β-hydroxy-A-nor-androstan-3-one tetrahydrofuranyl ether melting at 181 to 182° C. Optical rotation $[a]_D^{20°} = -50° \pm 1°$ (c.=1.004 in dioxan) and −55° ±1° (c.=1.040% in chloroform).

An analogous reaction of 5α-methyl-17β-hydroxy-A-nor-androstan-3-one with 2,3-dihydropyran in absolute ether in the presence of a small amount of para-toluenesulfonic acid as catalyst give rise to 5α-methyl-17β-hydroxy-A-nor-androstan-3-one tetrahydropyranyl ether.

What is claimed is:

1. Process for the manufacture of 3-oxo-5α-methyl-A-nor-androstanes wherein a compound of the formula

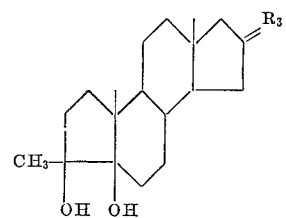

in which $R_3$ represents a member selected from the group consisting of

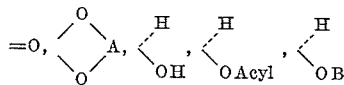

and

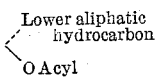

wherein A represents a lower alkylene group, B the residue of an alcohol selected from the group consisting of lower alkanol, a lower alkenol, tetrahydropyranyl alcohol and tetrahydrofuranyl alcohol and Acyl the residue of a carboxylic acid having 1 to 20 carbon atoms, is subjected to the pinacol rearrangement.

2. Process according to claim 1, wherein the starting materials are reacted with an acid agent capable of eliminating water.

3. Process according to claim 1, wherein the starting materials are reacted with a member selected from the group consisting of mineral acids, strong organic acids, their halides, and mixtures thereof.

4. Process as claimed in claim 1, wherein the starting materials are reacted with para-toluenesulfonic acid in glacial acetic acid.

5. A 5α-methyl-A-nor-androstane of the formula

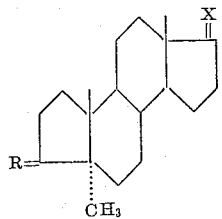

wherein R represents a member selected from the group consisting of an oxo group, a hydrogen atom together with a free hydroxy group and a hydrogen atom together with an esterified hydroxy group, X represents a member selected from the group consisting of

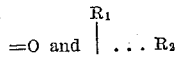

in which $R_1$ stands for a member selected from the group consisting of a free, esterified and etherified hydroxyl group, said esterified hydroxyl group being derived from an acid selected from the group consisting of alkanoic having from 1 to 20 carbon atoms, hexahydrobenzoic, cyclopentyl propionic, phenylpropionic, benzoic and furoic and said etherified hydroxyl group being derived from a member selected from the group consisting of a lower alkanol, a lower alkenol, tetrahydropyranyl alcohol and tetrahydrofuranyl alcohol, and $R_2$ stands for a member selected from the group consisting of hydrogen, lower alkyl, lower alkenyl, lower alkinyl, halo-lower alkyl, halo-lower alkenyl and halo-lower alkinyl.

6. A 5α-methyl-A-nor-androstane as claimed in claim 5, wherein each of said esterified hydroxy groups is derived from an hydroxy group esterified by an alkanoic acid having from 1 to 21 carbon atoms.

7. A 5α-methyl-A-nor-androstane as claimed in claim 5, wherein R stands for oxo, $R_1$ represents a free hydroxyl group and $R_2$ stands for a member selected from the group consisting of hydrogen, methyl and ethyl.

8. A 5α-methyl-A-nor-androstane as claimed in claim 5, wherein R stands for an oxo group, $R_1$ for the acetoxy group and $R_2$ for hydrogen.

9. A 5α-methyl-A-nor-androstane, as claimed in claim 5, wherein R stands for an oxo group, $R_1$ for the hydroxy group and $R_2$ for hydrogen.

10. A 5α-methyl-A-nor-androstane as claimed in claim 5, wherein R stands for an oxo group, $R_1$ for the hydroxy group and $R_2$ for the methyl group.

11. A 5α-methyl-A-nor-androstane as claimed in claim 5, wherein R stands for the oxo group, $R_1$ and $R_2$ together for the oxo group.

12. A 5α-methyl-A-nor-androstane as claimed in claim 5, wherein R stands for an oxo group, $R_1$ for the hydroxy group and $R_2$ for the ethinyl group.

13. A 5α-methyl-A-nor-androstane as claimed in claim 5, wherein R stands for the oxo group, $R_1$ for the tetrahydrofuranyloxy group and $R_2$ for hydrogen.

14. A 5α-methyl-A-nor-androstane as claimed in claim 5, wherein R stands for oxo, $R_1$ represents an esterified hydroxyl group derived from an alkanoic acid having from 1 to 20 carbon atoms, and $R_2$ stands for a member selected from the group consisting of hydrogen, methyl and ethyl.

References Cited

UNITED STATES PATENTS 2,228,577   1/1941   Marker _____ 260—586

HENRY R. JILES, *Primary Examiner.*

R. BOYD, *Assistant Examiner.*